(12) United States Patent
Churei

(10) Patent No.: US 12,542,598 B2
(45) Date of Patent: Feb. 3, 2026

(54) METHOD, COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Koji Churei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 18/478,323

(22) Filed: Sep. 29, 2023

(65) Prior Publication Data

US 2024/0039616 A1     Feb. 1, 2024

Related U.S. Application Data

(63) Continuation of application No. PCT/JP2021/048478, filed on Dec. 27, 2021.

(30) Foreign Application Priority Data

Mar. 30, 2021   (JP) ................................ 2021-058512

(51) Int. Cl.
      H04B 7/155   (2006.01)
(52) U.S. Cl.
      CPC ................. H04B 7/15507 (2013.01)
(58) Field of Classification Search
      CPC ........... H04B 7/15507; H04B 7/15528; H04W 16/26; H04W 40/02; H04W 40/08; H04W 40/30; H04W 40/36; H04W 48/10; H04W 40/12; H04W 24/08; H04W 40/22; H04W 40/34
      See application file for complete search history.

(56) References Cited

U.S. PATENT DOCUMENTS

| | | | |
|---|---|---|---|
| 2021/0259051 A1* | 8/2021 | Latheef | H04W 76/12 |
| 2021/0360439 A1* | 11/2021 | Akl | H04W 24/04 |
| 2022/0086749 A1* | 3/2022 | Ishii | H04W 40/22 |

FOREIGN PATENT DOCUMENTS

| | | |
|---|---|---|
| JP | 2019534625 A | 11/2019 |
| WO | 2018063892 A1 | 4/2018 |
| WO | 2019242623 A1 | 12/2019 |
| WO | 2020054077 A1 | 3/2020 |

OTHER PUBLICATIONS

ITRI; "Backhaul RLF handling"; [online], 3GPP TSG-RAN WG2 #107bis; Oct. 18, 2019; R2-1913063; URL:https://www.3gpp.org/ftp/tsg_ran/WG2_RL2/TSG2_107bis/Docs/R2-1913063.zip (Retrieved on Feb. 15, 2020); pp. 1-4.

* cited by examiner

*Primary Examiner* — Hashim S Bhatti
(74) *Attorney, Agent, or Firm* — Canon U.S.A., Inc. IP Division

(57) ABSTRACT

A method for providing functions as a node that relays communication between an Integrated Access and Backhaul (IAB) donor and user equipment in IAB, the method comprising: generating notification information; and periodically transmitting the generated notification information, wherein the notification information includes New Radio (NR) Cell Identity information in System Information Block (SIB) 1, and wherein the NR Cell Identity information includes identification information of the IAB donor.

7 Claims, 6 Drawing Sheets

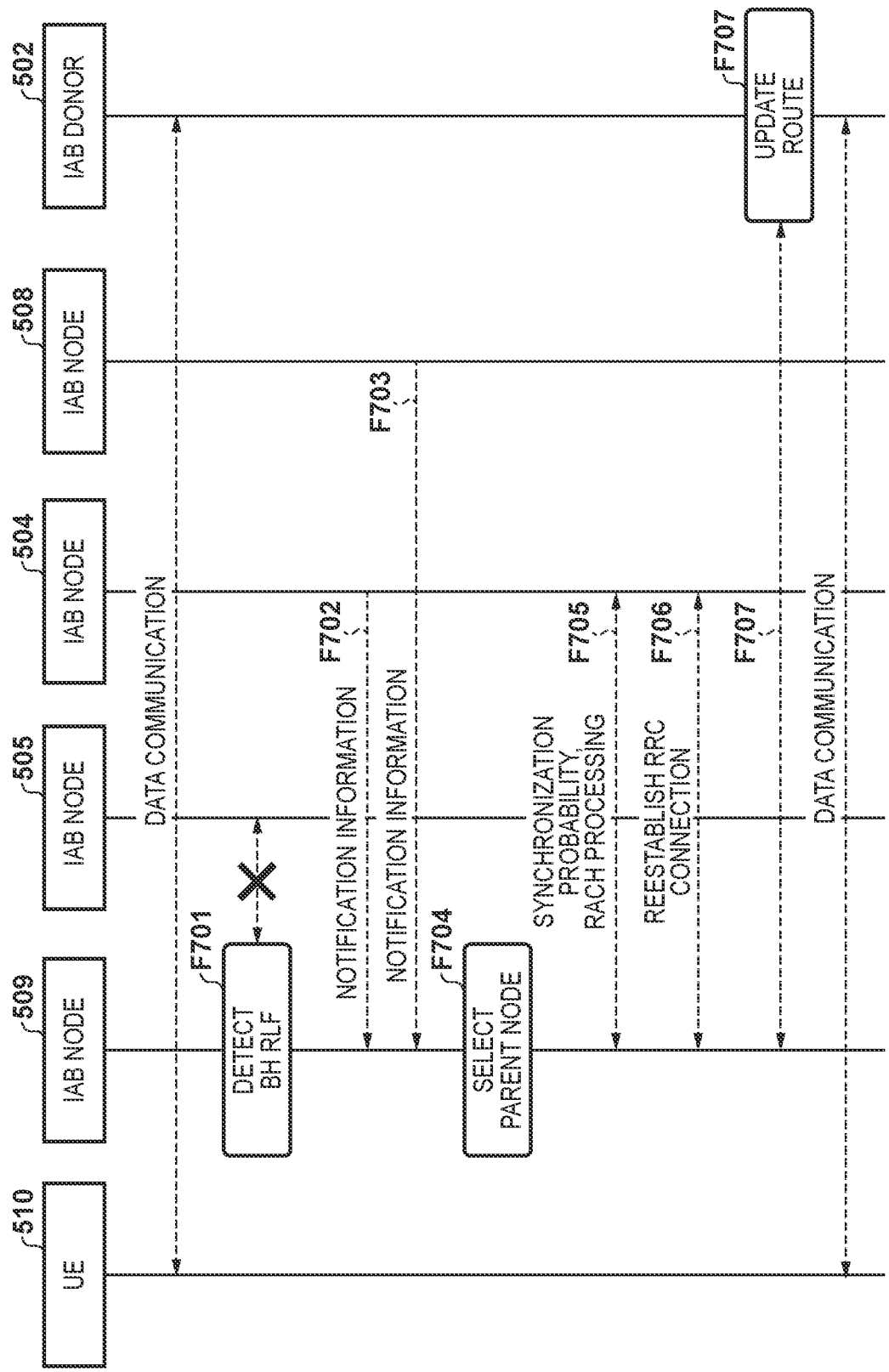

METHOD, COMMUNICATION APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP 2021/048478, filed Dec. 27, 2021, which claims the benefit of Japanese Patent Application No. 2021-058512 filed on Mar. 30, 2021, both of which are hereby incorporated by reference herein in their entireties.

BACKGROUND OF THE INVENTION

Field of the Invention

The present invention relates to wireless communication technology.

Background Art

The 3rd Generation Partnership Project (3GPP) has been proceeding with the standardization of Integrated Access and Backhaul (IAB) as communication technology for a backhaul. The IAB technology is the technology where millimeter-wave wireless communication in the 28-GHz band or the like, which is used in access communication between a base station and user equipment (UE), is simultaneously used as backhaul communication (PTL 1). In backhaul communication that uses the IAB technology, a relay device called an IAB node relays communication from an IAB donor, which is a base station, via millimeter-wave communication. By using the IAB technology, the area coverage can be expanded at low cost compared to conventional wired communication based on, for example, optical fibers.

In a case where the IAB technology is used, communication may be interrupted by disconnection of connection between IAB nodes caused by the occurrence of a wireless link failure (a backhaul radio link failure (BH RLF)) over a link between nodes in a network based on backhaul communication. In a case where the BH RLF has occurred, an IAB node can restore the communication by switching to connection to another IAB node that can be connected, and reestablishing a network via backhaul communication. Furthermore, also in cases other than the occurrence of the BH RLF, a change of a route that has already been established may become necessary be due to the influence of, for example, deterioration of the communication quality between IAB nodes.

CITATION LIST

Patent Literature

PTL 1: Japanese Patent Laid-Open No. 2019-534625

In backhaul communication, communication from an IAB donor, which is a rely source, is relayed from a parent node to a child node in order. For example, an IAB donor provides backhaul communication to an IAB node connected to this IAB donor; here, their relationship is such that this IAB donor is a parent node, and the IAB node connected to this IAB donor is a child node. Also, an IAB node regards an IAB donor (relay source) or another IAB node to which this IAB node is connected as a parent node, and relays backhaul communication to an IAB node that serves as a child node connected to this IAB node. Furthermore, a plurality of IAB nodes can be connected to a parent node, and a tree originating from an IAB donor can be structured.

In a case where an IAB node that serves as a parent node is to be switched due to, for example, the occurrent of a BH RLF, an IAB node disconnects connection to an IAB node to which it was connected before the switch (an old IAB node), and attempts to newly reconnect with an IAB node (a new IAB node). At this time, in a case where the old IAB node and the new IAB node both have the same IAB donor as a relay source of backhaul communication, communication can be restarted without requiring processing for reconnection to the IAB donor. However, in a case where the IAB donor is to be changed, the IAB node requires processing for reconnection to a post-change IAB donor. Therefore, the IAB node can restart communication more promptly when the IAB donor that serves as a relay source of backhaul communication is not to be changed at the time of reconnection to the new IAB node.

However, the IAB node does not include means for identifying the IAB donors that respectively serve as relay sources for the old IAB node and the new IAB node in backhaul communication. For this reason, the IAB node cannot reselect an appropriate parent node in consideration of an IAB donor when a parent node is to be changed.

SUMMARY OF THE INVENTION

Various embodiments of the present disclosure provide a technique to efficiently execute reconnection to a network via backhaul communication.

A communication apparatus according to one aspect of the present invention has the following configuration as means for achieving the aforementioned object. That is to say, a method for providing functions as a node that relays communication between an Integrated Access and Backhaul (IAB) donor and user equipment in IAB, comprises: generating notification information; and periodically transmitting the generated notification information, wherein the notification information includes New Radio (NR) Cell Identity information in System Information Block (SIB) 1, and wherein the NR Cell Identity information includes identification information of the IAB donor.

Furthermore, a communication apparatus according to another aspect of the present invention has the following configuration. That is to say, a communication apparatus for providing functions as a node that relays communication between an Integrated Access and Backhaul (IAB) donor and user equipment in IAB, comprises: generation unit configured to generate notification information; and transmission unit configured to periodically transmit the generated notification information, wherein the notification information includes New Radio (NR) Cell Identity information in System Information Block (SIB) 1, and wherein the NR Cell Identity information includes identification information of the IAB donor.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 7 is a diagram showing an example of a communication sequence for changing a parent node.

DESCRIPTION OF THE EMBODIMENTS

Figure 1:
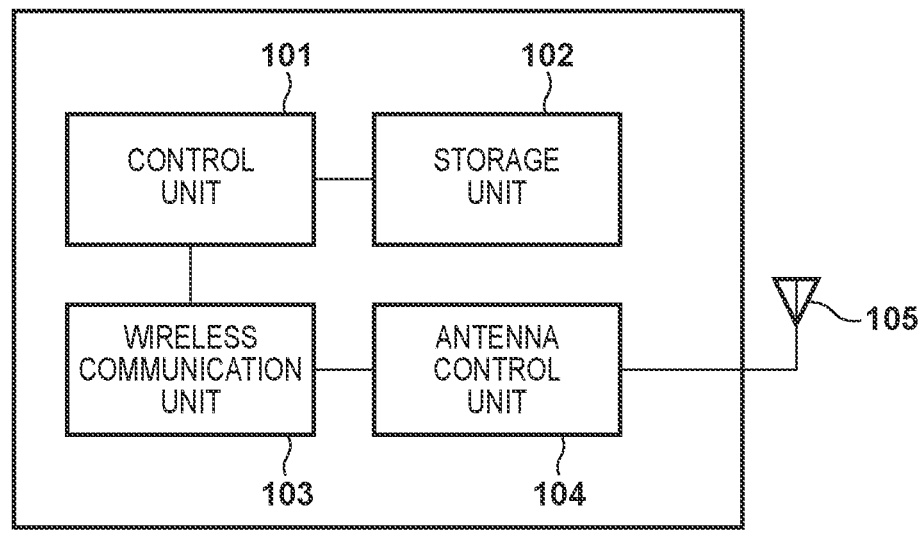
FIG. 1 is a block diagram of a hardware configuration of an TAB node according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Configuration of Communication System>

Figure 5:
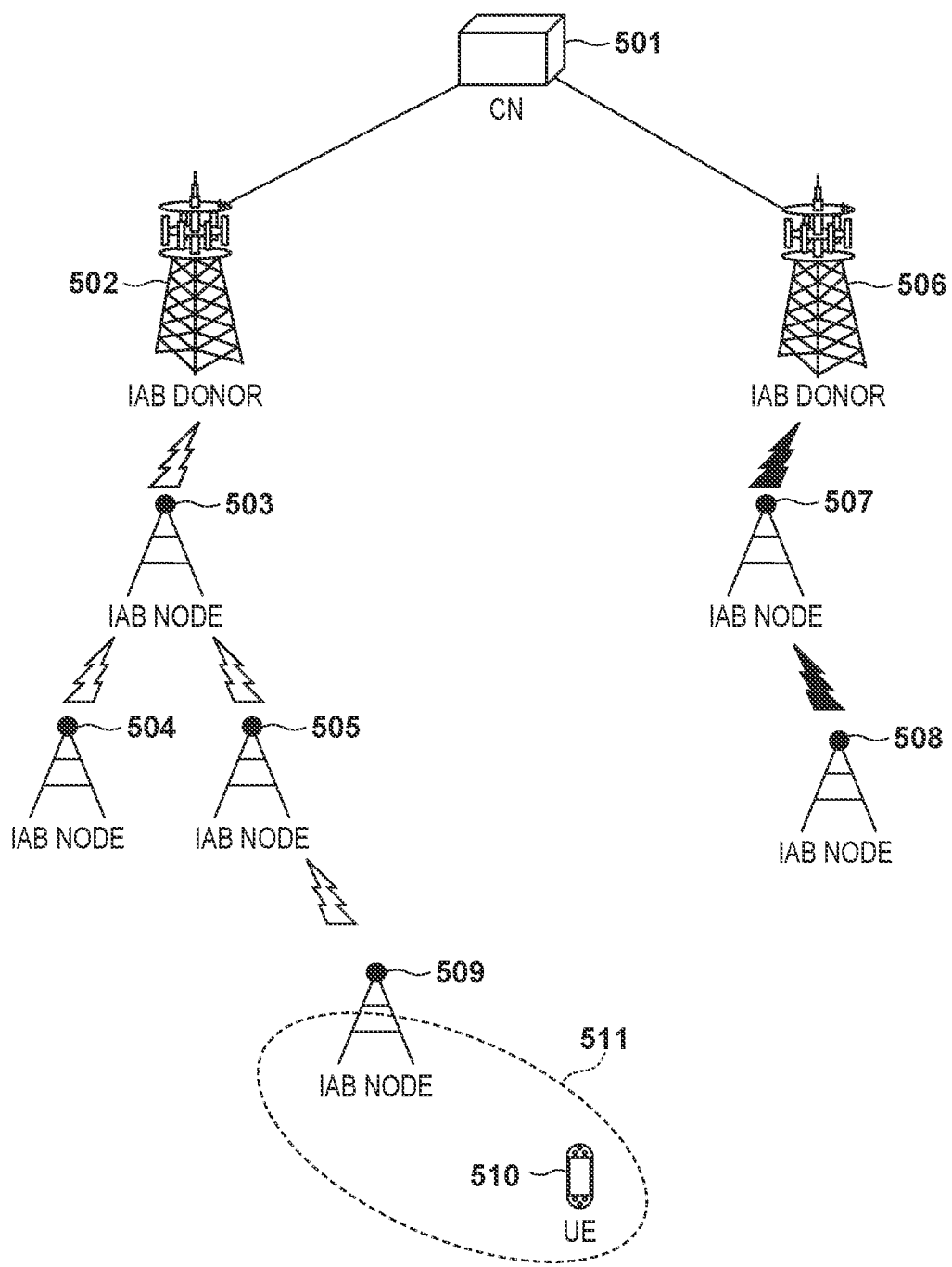
FIG. 5 shows an exemplary configuration of a backhaul communication system according to an embodiment.

FIG. 5 shows an exemplary configuration of a backhaul communication system (a network based on backhaul communication) according to a present embodiment. Th communication system includes an IAB donor 502 and an IAB donor 506 as IAB donors connected to a core network 501. The IAB donor 502 and the IAB donor 506 provide, to IAB nodes that are connected to themselves as child nodes, connection to the core network 501 via backhaul communication (that is to say, provide backhaul communication thereto). An IAB node 503 is connected to the IAB donor 502 as a child node. Also, an IAB node 504 and an IAB node 505 are connected to the IAB node 503 as child nodes. Furthermore, an IAB node 509 is connected to the IAB node 505 as a child node. On the other hand, an IAB node 507 is connected to the IAB donor 506 as a child node, and an IAB node 508 is connected to the IAB node 507 as a child node. Each of the IAB donors and the IAB nodes functions as a wireless base station apparatus.

User equipment (UE) 510, which performs communication in a cell area 511 of a cell in which the IAB node 509 provides a service, can connect to the core network 501 via each of the IAB donors and the IAB nodes. It is assumed that, in the communication system shown in FIG. 5, the UE 510 is connected to the core network 501 via the IAB node 509.

Note that the arrangements/configurations of the communication apparatuses in the communication system shown in FIG. 5 (the IAB donors 502 and 506, the IAB nodes 503 to 505 and 507 to 509, and the UE 510) are examples, and the following description is applicable to other arrangements/configurations. Furthermore, these communication apparatuses are communication apparatuses in a fifth-generation (5G) access network, which is also called a New Radio (NR) access network, and the wireless base station apparatuses (the IAB donors 502 and 506, and the IAB nodes 503 to 505 and 507 to 509) are also called gNB. Note that the following description is also applicable to configurations based on other next-generation networks.

<Hardware Configuration and Function Configuration of IAB Node>

The following describes the configurations (hardware configuration and software function configuration) of an IAB node (a radio access network (RAN) node) according to the present embodiment. FIG. 1 shows an exemplary hardware configuration of an IAB node. A control unit 101 is composed of one or more central processing units (CPUs) and the like, and controls the entire apparatus by executing a control program stored in a storage unit 102. The storage unit 102 is composed of storage means, such as a read-only memory (ROM) and a random-access memory (RAM), and stores the control program executed by the control unit 101 and various types of information, such as cell information, connected terminal information, and IAB routing information. Various types of operations to be described later can be performed by the control unit 101 executing the control program stored in the storage unit 102. Also, a public land mobile network (PLMN) (public mobile telephone network) identity (ID), which is an ID that enables identification of a communication service provider, has been set and stored (registered) in the storage unit 102 by the communication service provider. A wireless communication unit 103 executes wireless communication that conforms to the standard of the 3rd Generation Partnership Project (3GPP), such as cellular network communication based on long-term evolution (LTE), 5th generation (5G), and the like. An antenna control unit 104 controls an antenna 105 for wireless communication performed by the wireless communication unit 103.

Figure 2:
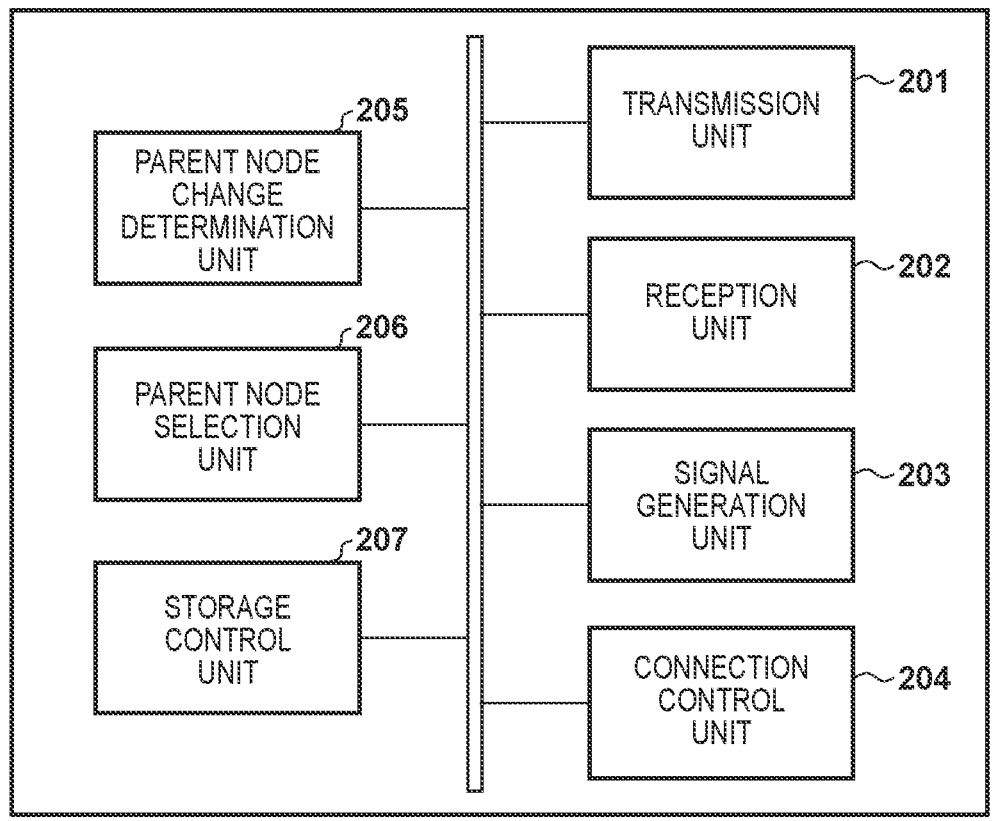
FIG. 2 is a block diagram of a software function configuration of an TAB node according to an embodiment.

FIG. 2 shows an exemplary software function configuration of an IAB node. A transmission unit 201 transmits various types of signals (including frames and information) to another communication apparatus (communication partner apparatus) via the wireless communication unit 103 (FIG. 1). A reception unit 202 receives various types of signals from another communication apparatus via the wireless communication unit 103. A signal generation unit 203 generates various types of signals that are transmitted via the transmission unit 201. A connection control unit 204 controls connection to another communication apparatus by way of communication via the transmission unit 201 and the reception unit 202. For example, the connection control unit 204 executes processing related to connection and disconnection with respect to another communication apparatus by communicating Radio Resource Control (RRC) messages via the transmission unit 201 and the reception unit 202. A parent node change determination unit 205 determines a change of a parent node connected to the IAB node. Note that in the following description, a parent node is used interchangeably with a connection node, and refers to a node that connects to the IAB node and relays communication between the IAB node and an IAB donor. For example, upon detecting the occurrence of a wireless link failure over a link between the IAB node and a parent node (connection node), the parent node change determination unit 205 can determine that the parent node is to be changed. A parent node selection unit 206 selects/determines a parent node to connect to in backhaul communication. A storage control unit 207 performs storage control (storage processing, readout processing, and the like) with respect to the storage unit 102.

Note that an IAB donor, too, can have a hardware configuration and a software function configuration that are similar to those of the IAB node. Note that the IAB donor need not include the parent node selection unit 206.

In the present embodiment, the signal generation unit 203 generates a signal called notification information (e.g., a System Information Block (SIB) 1) for each cell, which is a communication-enabled area provided by the IAB node itself. This notification information is transmitted to the surroundings via the transmission unit 201 on a regular basis. Another communication apparatus (another IAB node or UE) can recognize that the IAB node exists in the vicinity thereof by receiving the notification information, and execute processing for connection to this IAB node. In a case where the parent node selection unit 206 has determined that the connected parent node is to be changed, the signal generation unit 203 can change the content of notification information to be generated.

Figure 3:
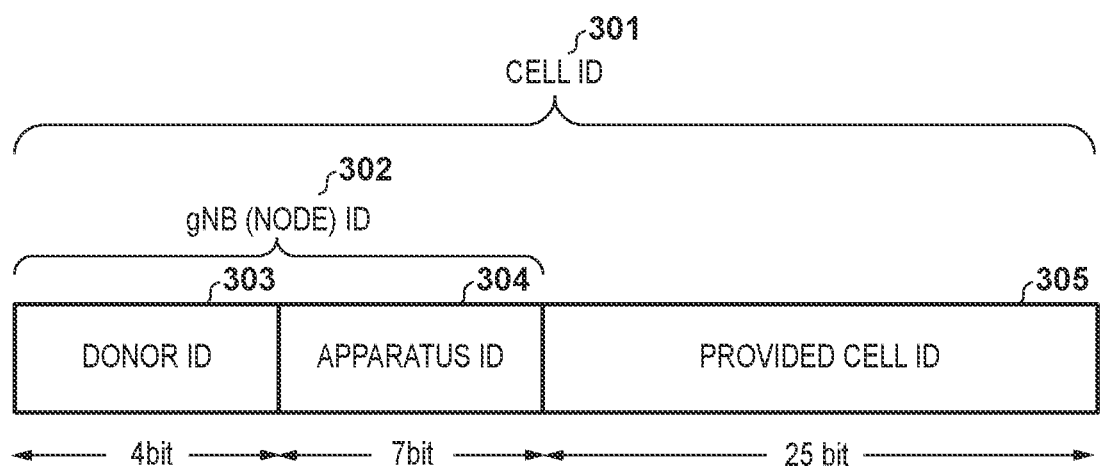
FIG. 3 is a diagram showing exemplary structures of information elements of a cell ID included in notification information.

Notification information generated by the signal generation unit 203 can include information elements of various types of wireless-related parameters, such as a PLMN ID and a cell ID. Note that when in conformity with the 3GPP, the PLMN ID corresponds to a PLMN Identity included in an SIB 1, which is a type of notification information, and the cell ID corresponds to an NR Cell Identity in the SIB 1. The cell ID is a cell ID for identifying a cell provided by the IAB node. FIG. 3 shows exemplary structures of information elements (IEs) of a cell ID included in notification information according to the present embodiment.

A cell ID 301, which is an information element of the cell ID, is composed of a 36-bit bit sequence in which the most significant 11 bits represent a node ID field 302, and the least significant 25 bits represent a provided cell ID field 305. The gNB (node) IDs that enable identification of the respective wireless base station apparatuses (an IAB donor and an IAB node) in the network are set in the node ID field 302. A provided cell ID that is uniquely allocated to a cell provided by each wireless base station apparatus is set in the provided cell ID field 305. Furthermore, the node ID field 302 is composed of a donor ID field 303 and an apparatus ID field 304. A 4-bit donor ID that is uniquely allocated to an IAB donor connected to the core network (identification information of the IAB donor) is set in the donor ID field 303. A 7-bit apparatus ID that is uniquely allocated to each wireless base station apparatus is set in the apparatus ID field 304 (an apparatus ID of the apparatus that transmits notification information). Note that the bit range of each field inside the node ID field 302 is not limited to the above, and may have other appropriate structures.

It is sufficient that the ID value set in the donor ID field 303 be unique to each IAB donor. In the present embodiment, it is assumed that the most significant bit in the donor ID field 303 indicates whether the ID value stored in the field represented by the donor ID field 303 (i.e., the donor ID) is valid. For example, the ID value stored in the donor ID field 303 is valid (i.e., the donor ID is included) in a case where the most significant bit in the donor ID field 303 has a value of 1, and the ID value is invalid (i.e., the donor ID is not included) in a case where the most significant bit has a value of 0. Note that this is an example, and whether the ID value stored in the donor ID field 303 is valid or invalid may be indicated by other bits/means.

In a case where the wireless base station apparatus that transmits the notification information is an IAB donor, the signal generation unit 203 of the IAB donor stores a donor ID allocated to the IAB donor itself in the donor ID field 303. The donor ID can be allocated to the IAB donor in the system in advance. Alternatively, the donor ID may be allocated to the IAB donor by other means. On the other hand, in a case where the wireless base station apparatus that transmits the notification information is an IAB node, the signal generation unit 203 of the IAB node sets/changes the value of the donor ID field 303 in the transmitted notification information based on notification information received from a parent node. That is to say, the donor ID of the IAB donor connected to the parent node can be set in the donor ID field 303 of the transmitted notification information.

<Flow of Processing>

A procedure for generating and transmitting notification information will be described first with reference to FIG. 4, and a procedure for changing a parent node will be described next with reference to FIG. 5 and FIG. 6, as procedures of processing executed by an IAB node according to the present embodiment.

Figure 4:
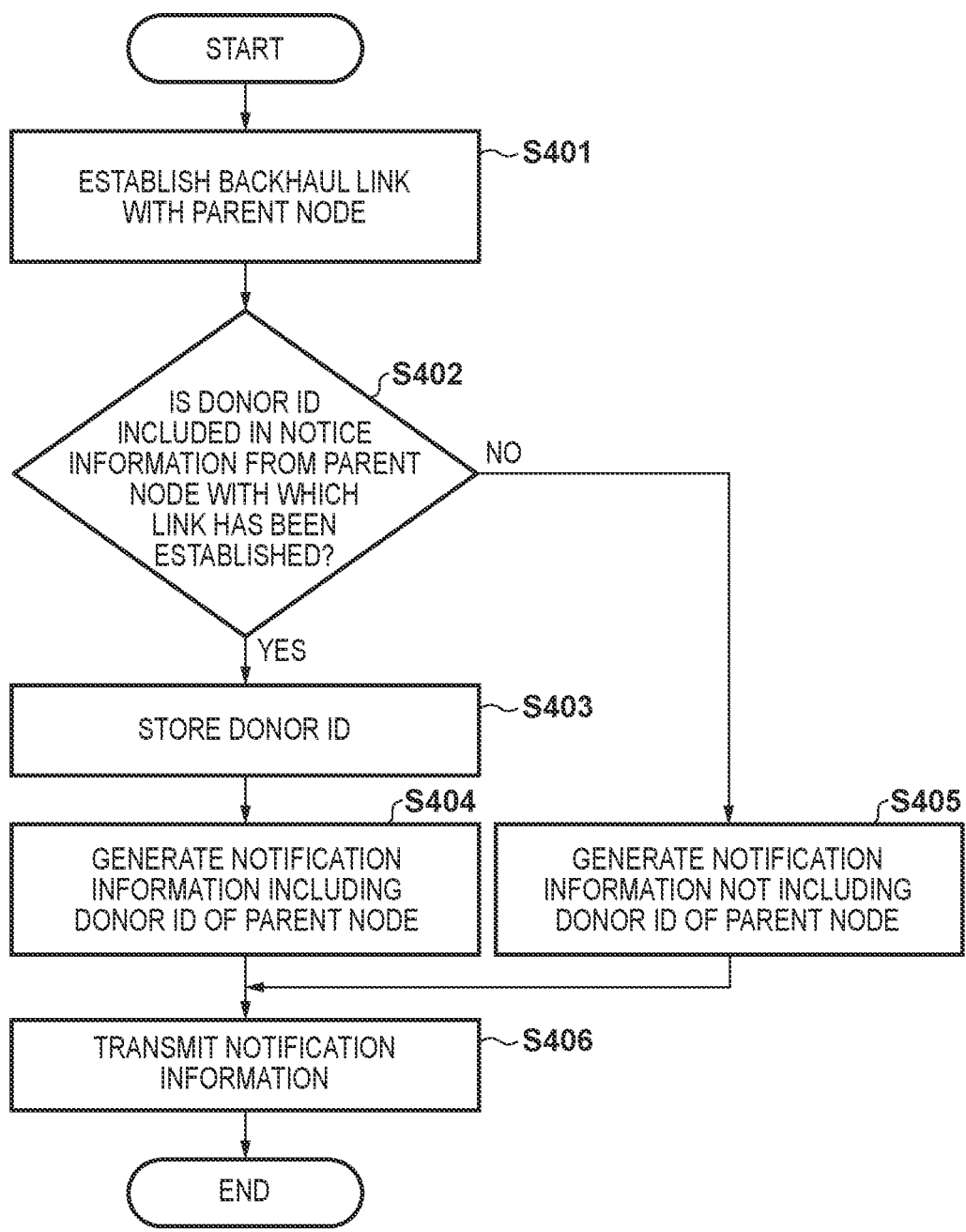
FIG. 4 is a flowchart showing an example of a procedure in which an TAB node generates and transmits notification information.

FIG. 4 shows a flowchart illustrating an example of a procedure for generating and transmitting notification information in an IAB node according to the present embodiment. Processing of the present flowchart is started when the IAB node connects to a parent node. The flowchart shown in FIG. 4 can be realized by the control unit 101 of the IAB node executing the control program stored in the storage unit 102, computing and processing information, and executing control of each item of hardware.

In S401, the connection control unit 204 connects to a parent node, and establishes a backhaul link with the parent node. After the link has been established, the reception unit 202 receives notification information transmitted from the parent node with which the link has been established in S401. It is assumed here that the cell ID information elements of the notification information have the structures shown in FIG. 3 (the cell ID 301). In S402, the signal generation unit 203 determines whether this notification information includes a donor ID. This determination can be made by examining the most significant bit in the donor ID field 303 as stated earlier. In a case where the donor ID is included (Yes of S402), the signal generation unit 203 extracts the donor ID, and processing proceeds to S403; in a case where the donor ID is not included (No of S402), processing proceeds to S405.

In S403, the storage control unit 207 stores (registers) the donor ID extracted in S402 into the storage unit 102. In S404, the signal generation unit 203 generates notification information in which the donor ID stored in S403 is set in the donor ID field 303, and the apparatus ID of the IAB node itself is set in the apparatus ID field 304. On the other hand, in S405, the signal generation unit 203 generates notification information that does not include a donor ID. That is to say, the signal generation unit 203 generates notification information in which a value of 0 is set as the most significant bit in the donor ID field 303. In S406, the transmission unit 201 transmits the generated notification information, and ends processing. Thereafter, the transmission unit 201 transmits the notification information at an interval of a fixed period.

As a result of the aforementioned flow, a donor ID indicating an IAB donor that serves as a relay source of backhaul communication is set in notification information of every IAB node connected under the IAB donor, and transmitted.

Next, the procedure in which the IAB node changes the parent node will be described. FIG. 6 shows a flowchart illustrating an example of the procedure in which the IAB node changes the parent node (connected cell) according to the present embodiment. Processing of the present flowchart is started by the parent node change determination unit 205 when a BH RLF has occurred over a link between the IAB node and the parent node. Furthermore, no limitation is intended by this, and processing may be started when the parent node change determination unit 205 has detected that the wireless communication quality over the link between the IAB node and the parent node has fallen below a predetermined level, and determined that the IAB node is to change the parent node. The flowchart shown in FIG. 6 can be realized by the control unit 101 of the IAB node executing the control program stored in the storage unit 102, computing and processing information, and executing control of each item of hardware.

Note, it is assumed that the IAB node has stored (registered) a PLMN ID, which is an ID that enables identification of a communication service provider, in the storage unit 102 as stated earlier. Furthermore, it is assumed that, in a case where a donor ID has been set in the cell ID information elements (the cell ID 301 of FIG. 3) in notification information received from the pre-change parent node, the IAB node has stored this donor ID in the storage unit 102. Furthermore, notification information includes a PLMN ID and information elements of a cell ID as stated earlier. These pieces of information are associated with the cell of the apparatus ID set in the apparatus ID field 304 and the cell ID set in the provided cell ID field 305, which are information related to the IAB node that serves as a transmission source of this notification information.

In S601, the reception unit 202 of the IAB node receives notification information pieces transmitted from one or more other surrounding IAB nodes (one or more cells). Note that in the following description, one or more other IAB nodes that transmit notification information pieces are also simply referred to as nodes. In S602, the parent node selection unit 206 extracts PLMN IDs from the received notification information pieces. Then, the parent node selection unit 206 determines whether there is a node (cell) with a PLMN ID that matches the PLMN ID stored in the storage unit 102. The cell with a PLMN ID that matches the stored PLMN ID is a node (cell) to which the IAB node can be connected. In a case where there is a node with a PLMN ID that matches the stored PLMN ID (Yes of S602), processing proceeds to S603. In a case where there is no such node (No of S602), processing returns to S601 again, and the IAB node looks for a connectable node based on notification information pieces that are received on a regular basis.

In S603, the parent node selection unit 206 extracts donor IDs (ID values set in the donor ID fields 303) from the received notification information pieces. Then, the parent node selection unit 206 determines whether there is a node (cell) with a donor ID that matches a donor ID stored in the storage unit 102. In a case where the IAB node has stored a donor ID, this donor ID is a donor ID indicating the IAB donor that has been connected (via a parent node). Therefore, selecting a node (cell) with a donor ID that matches the stored donor ID means that the IAB donor that serves as a relay source is not to be changed. In a case where there is a node with a donor ID that matches the stored donor ID (Yes of S603), processing proceeds to S604; in a case where there is no such node, or in a case where the storage unit 102 does not store a donor ID (No of S603), processing proceeds to S607.

In S604, the parent node selection unit 206 determines whether there are a plurality of nodes (cells) that satisfy the condition of S603, that is to say, whether there are a plurality of nodes with a donor ID that matches the stored donor ID. In a case where there are a plurality of nodes with a donor ID that matches the stored donor ID (Yes of S604), processing proceeds to S605. In S605, the parent node selection unit 206 selects, from among these plurality of nodes, a node that has the largest (highest) radio wave strength in connection with the IAB node (radio wave strength in the cell) as a parent node (i.e., a relay node). Examples of the radio wave strength include information elements related to radio wave reception strengths, such as a Reference Signal Received Power (RSRP) value, a Received Signal Code Power (RSCP) value, Ec/N0 (a carrier-to-noise ratio), and a path loss (propagation loss). In a case where there is only one node with a donor ID that matches the stored donor ID (No of S604), the parent node selection unit 206 selects this node as a parent node (S606).

In S607, the parent node selection unit 206 determines whether there are a plurality of nodes that satisfy the condition of S602 in a case where there is no node (cell) with a donor ID that matches the stored donor ID. That is to say, the parent node selection unit 206 determines whether there are a plurality of nodes with a PLMN ID that matches the stored PLMN ID. In a case where there are a plurality of nodes with a PLMN ID that matches the stored PLMN ID (Yes of S607), processing proceeds to S608. In S608, the parent node selection unit 206 selects, from among these plurality of nodes, a node with the largest radio wave strength as a parent node. Examples of the radio wave strength are as described above. In a case where there is only one node with a PLMN ID that matches the stored PLMN ID (No of S607), the parent node selection unit 206 selects this node as a parent node (S609).

In S610, the connection control unit 204 of the IAB node executes connection processing with respect to the node that has been selected/determined as the parent node through processing of any of steps S605 to S609, and the present flow is ended.

Note that according to the above description, in a case where there are one or more nodes with a donor ID that matches the stored donor ID, the IAB node selects one node from among these one or more nodes as a parent node. However, in a case where the radio wave strengths of these one or more nodes fall below a predetermined criterion, processing may proceed to S607.

Next, a description is given of the operations in the communication system with reference to FIG. 7. FIG. 7 represents a diagram showing an example of a communication sequence for changing a parent node. For this communication sequence, the communication system of FIG. 5 is referred to. It is assumed that, as shown in FIG. 5, the UE 510 is in a state where it is connected to the core network 501 via the IAB node 509 and can perform data communication via the core network 501. Here, assume that a wireless link failure (backhaul radio link failure (BH RLF)) has occurred over, for example, a link (physical layer) between the IAB node 509 and a parent node thereof, namely the IAB node 505. In a case where the IAB node 509 has detected the BH RLF between itself and the IAB node 505 and failure recovery is not achieved within a fixed period, the (detection of) BH RLF is declared (F701). The UE 510 is placed in a state where it cannot perform data communication via the core network 501.

Figure 6:
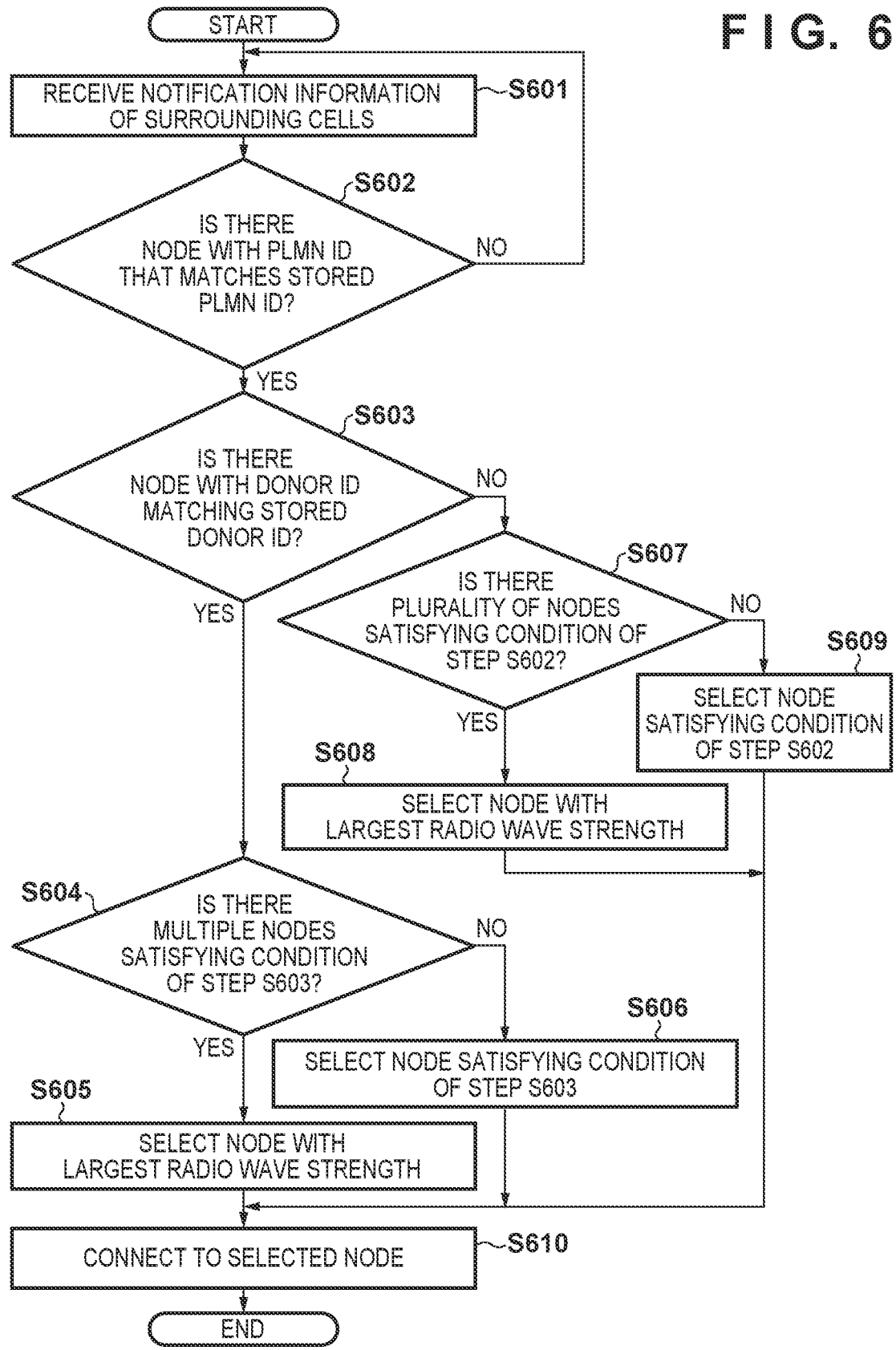
FIG. 6 is a flowchart showing an example of a procedure in which an IAB node changes a parent node.

At this time, the IAB node 509, which has been disconnected from the network, executes the procedure for changing a parent node shown in FIG. 6. That is to say, first, the IAB node 509 receives notification information transmitted from the IAB node 504 and notification information transmitted from the IAB node 508 (S601, F702, F703). Subsequently, the IAB node 509 selects (determines) a parent node based on the received notification information pieces (F704).

In the present example, it is assumed that the PLMN IDs included in the notification information pieces from the IAB node 504 and the IAB node 508 both match the PLMN ID stored (registered) in the IAB node 509 (Yes of S602), and the IAB node 509 executes processing of S603. The IAB node 509 extracts the donor IDs from the notification information pieces transmitted from the IAB node 504 and the IAB node 508, and compares them with the stored donor ID. The donor ID included in the notification information transmitted from the IAB node 504 indicates the IAB donor 502, whereas the donor ID included in the notification information transmitted from the IAB node 508 indicates the IAB donor 506. As the IAB node 509 was connected to the IAB node 505 before the occurrence of the BH RLF, the stored donor ID is a donor ID indicating the IAB donor 502. That is to say, the donor ID stored in the IAB node 509 matches the donor ID included in the notification information transmitted from the IAB node 504 (Yes of S603, No of S604). As a result, the IAB node 509 selects the IAB node 504 as a parent node that serves as a reconnection destination under the same IAB donor 502 as before the reconnection (S606).

After the IAB node 504 has been selected, the IAB node 509 executes connection processing. Specifically, the IAB node 509 establishes synchronization with the IAB node 504 and executes random-access channel (RACH) access processing (F705), and then connects to the IAB node 504 by reestablishing RRC connection (F706).

As the IAB donor 502 manages route information pieces for the IAB nodes connected thereunder, it updates route information for the IAB node 509 (F707). Specifically, the IAB donor updates old route information that indicates relaying via the IAB node 503 and the IAB node 505, to new route information that indicates relaying via the IAB node 503 and the IAB node 504. From then on, the UE 510 is placed in a state where it can perform data communication via the core network 501 again.

If the IAB node 509 determines to connect to the IAB node 508 under the IAB donor 506, which is different from before the reconnection, in F704, processing for disconnection from the connected UE 510 and processing for, for example, connection to the IAB donor 506 via an F1 interface will become necessary. Furthermore, as processing on the UE 510 side, processing for reconnection to the IAB node 509 that has switched the IAB donor needs to be executed. Connecting to an IAB node under the same IAB donor as before the reconnection provides the IAB node 509 and the UE 510 with an advantage whereby they can revert to a state where data communication can be performed without executing the aforementioned processing.

As described above, according to the present embodiment, as information of an IAB donor is included in notification information, a processing load associated with reconnection to a network via backhaul communication is reduced in an IAB node, and this reconnection can be performed efficiently. Furthermore, when selecting a parent node that serves as a reconnection destination, the IAB node can select an appropriate parent node.

According to the present invention, a technique to efficiently perform reconnection to a network via backhaul communication is provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for providing functions as a node that relays communication between an Integrated Access and Backhaul (IAB) donor and user equipment in IAB, the method comprising:
   determining that a connection node is to be changed, the connection node being connected to the communication apparatus and relaying communication between the communication apparatus and the IAB donor;
   receiving, from one or more other communication apparatuses that are connectable to the communication apparatus, New Radio (NR) Cell Identity information in System Information Block (SIB) 1; and
   in a case where the connection node is determined to be changed in a state where the communication apparatus is connected to a first another communication apparatus as the connection node, specifying identification information of the IAB donor to which the one or more communication apparatuses connect based on the NR Cell Identity information, and newly selecting a second another communication apparatus as a changed connection node from among the one or more other communication apparatuses based on the specified identification information pieces of the IAB donors.

2. The method according to claim 1, further comprising:
   storing the identification information piece of the IAB donor into a storage area,
   wherein, in the selection, in a case where the specified identification information pieces of the IAB donors matches the identification information piece stored in the storage area, another communication apparatus that has transmitted the NR Cell Identity information including the matching identification information piece is selected as the second another communication apparatus.

3. The method according to claim 2, wherein
   in a case where there are a plurality of other communication apparatuses that have transmitted the NR Cell Identity information including the matching identification information piece of the IAB donor, another communication apparatus that exhibits a high radio wave strength in connection with the communication apparatus is selected as the second another communication apparatus from among the plurality of other communication apparatuses in the selection.

4. The method according to claim 3, wherein
in a case where there are not a plurality of other communication apparatuses that have transmitted the NR Cell Identity information including the matching identification information piece of the IAB donor from among the plurality of other communication apparatuses, another communication apparatus that exhibits a high radio wave strength in connection with the communication apparatus is selected as the second another communication apparatus in the selection.

5. The method according to claim 1, wherein
after the communication apparatus is connected to the first another communication apparatus as the connection node, the connection node is determined to be changed upon detection of an occurrence of a wireless link failure over a link between the communication apparatus and the first another communication apparatus in the determination.

6. The method according to claim 1, wherein
after the communication apparatus is connected to the first another communication apparatus as the connection node, the connection node is determined to be changed, in the determination, when a wireless communication quality between the communication apparatus and the first another communication apparatus has fallen below a predetermined level.

7. A non-transitory computer-readable storage medium for storing a program for causing a computer to perform a method for providing functions as a node that relays communication between an Integrated Access and Backhaul (IAB) donor and user equipment in IAB, the method comprising:

determining that a connection node is to be changed, the connection node being connected to a communication apparatus and relaying communication between the communication apparatus and the IAB donor;

receiving, from one or more other communication apparatuses that are connectable to the communication apparatus, New Radio (NR) Cell Identity information in System Information Block (SIB) 1; and selection unit configured to, in a case where the determination unit has determined that the connection node is to be changed in a state where the communication apparatus is connected to a first another communication apparatus as the connection node, specifying identification information of the IAB donor to which the one or more communication apparatuses connect based on the NR Cell Identity information, and newly select a second another communication apparatus as a changed connection node from among the one or more other communication apparatuses based on the specified identification information pieces of the IAB donors.

* * * * *